June 30, 1959  H. G. TWIFORD  2,892,491
POWER OPERATED BEAD BREAKER
Filed May 23, 1955

INVENTOR.
HARRY G. TWIFORD
BY
*McGrew & Edwards*
ATTORNEYS

United States Patent Office 2,892,491
Patented June 30, 1959

2,892,491
POWER OPERATED BEAD BREAKER
Harry G. Twiford, Denver, Colo.
Application May 23, 1955, Serial No. 510,430
3 Claims. (Cl. 157—1.28)

This invention relates to pneumatic tire handling machines and more particularly to machines for loosening a pneumatic tire from vehicle wheels, primarily for breaking the tire beads from the receiving flanges of the wheel.

Most modern day tires require considerable force to break the casing beads loose from the receiving flanges of a drop-center rim wheel, even when the tire has been recently mounted on the wheel. Tires which have not been removed from the wheel for a considerable length of time and tubeless tires, especially, are very difficult to loosen and may require several workers with conventional equipment just to break the bead loose from the flange. Due to the tenacious holding of the casing to the wheel and to inadequate tools for the bead breaking, the tire may be severely damaged during a tire change. The majority of available tire changing machines have manually operated bead breakers which may be utilized for some tires but are not usable for the difficult ones.

According to the present invention, I provide a simple, inexpensive tire bead breaker utilizing a novel fluid motor system arranged for easily and quickly breaking the bead of a pneumatic tire from the receiving flange of a drop-center rim vehicle wheel. The device is fast acting and efficient in breaking the beads of a tire from the rim of a wheel with a minimum of physical effort on the part of the operator. The device automatically centers on the tire on which it is operating and simultaneously breaks both beads of the tire from the wheel. The bead breaking jaws are arranged to be positioned on the tire bead itself during the actual bead breaking operation to prevent damage to the tire side walls and to assure complete loosening of the bead from the wheel.

Included among the objects and advantages of the present invention is an automatically centering bead breaker utilizing a fluid motor actuating the bead breaking jaws of the machine for loosening the bead of a pneumatic tire from the receding flange of the wheel. The bead breaking device provides a fast-acting, inexpensive, compressed-air powered cylinder for activating the bead breaking jaws, which utilizes means for positively pushing the bead breaking jaws onto the bead of a tire so that the jaws push on the bead of the tire during the operation thereof.

These and other objects and advantages of the invention may be readily ascertained by referring to the following description and appended drawings in which.

Figure 1:
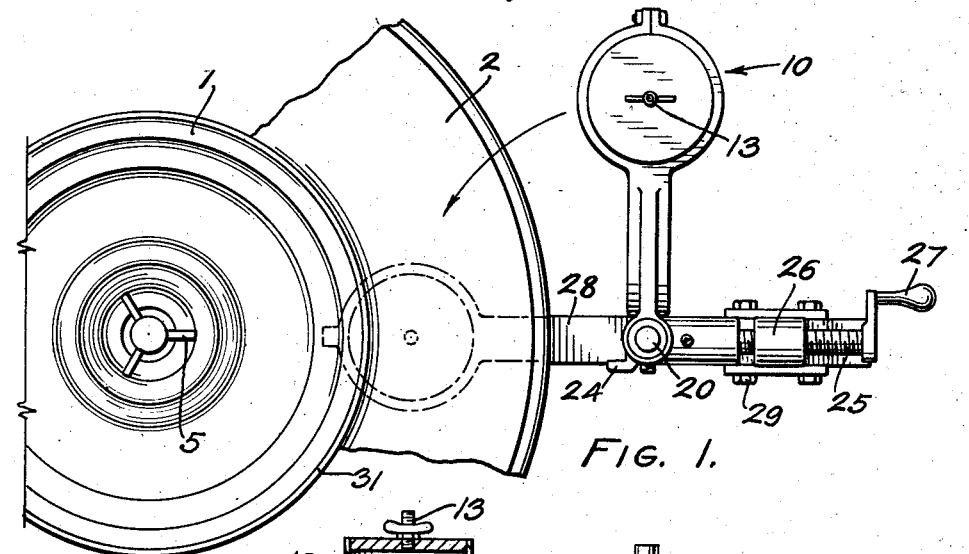
Fig. 1 is a top plan view of a bead breaker according to the invention.
Figure 2:
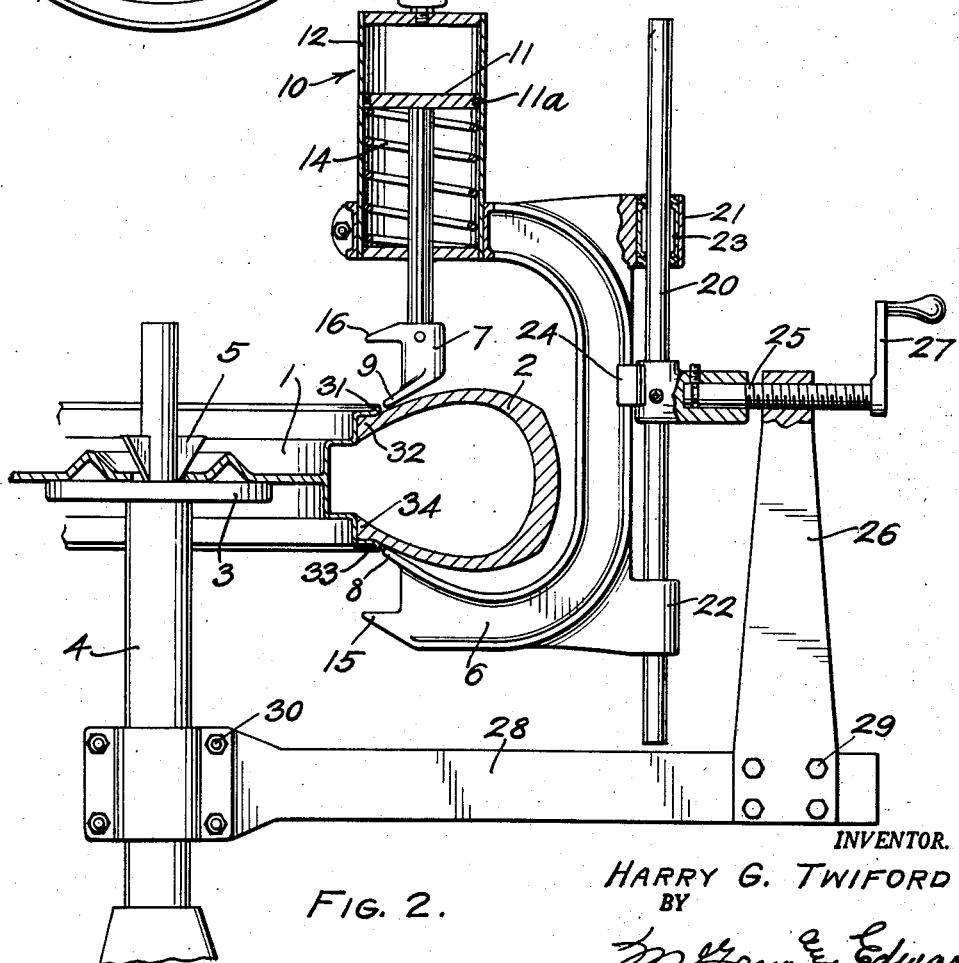
Fig. 2 is a cross-sectional side elevation of a bead breaker in operation on a tire.

In the device illustrated, a wheel 1 having a pneumatic tire 2 mounted thereon is supported horizontally on a table 3. The table 3 is mounted on a first substantially upright support 4 which is fastened to a supporting surface by means not shown. A clamp-down device 5, which may be a cone, a tripod, or similar type device centers and holds the wheel on the table in position for operation of the bead breaker. The bead breaker comprises a C-shaped member or arcuate jaw 6 having a coacting reciprocal jaw or bead engaging element 7 juxtaposed thereabove. The breaker has a bead engaging means including a point 8 on the extremity of the arcuate jaw 6. The jaw 7, similarly, has a companion bead engaging element including a contacting point 9 juxtaposed above the contacting point 8. A reciprocating power means in the form of a fluid motor, shown in general by numeral 10, includes a piston 11 mounted in a cylinder 12 arranged to cause reciprocal movement of the jaw 7. An air valve 13 permits the entry and exit of activating air into the cylinder, and a spring 14 retrieves the piston from projected to retracted position when the air in the cylinder is released. The jaw 6 has a rim engaging element or stop portion 15 which prevents the bead contact point 8 passing beyond a predetermined distance from the rim, and jaw 7 has a similar rim engaging element or contacting point 16. Normally, applying pressure simultaneously to both beads of a tire will break one bead loose from the rim before the other. To prevent the jaw from pushing the loosened bead into the other bead the rim contacting points prevent further movement of the jaw so that the opposing jaw will move to loosen the opposite bead.

The bead breaking jaw assembly is journalled for reciprocal movement on a substantially vertical rod 20, and upper bushing 21 and lower bushing 22 hold the jaw in substantially vertical position on the rod 20. In one preferred form, a plurality of small roller bearings 23 are provided in the bearings 21 and 22 so as to provide free reciprocal movement of the jaw on the rod. During the bead breaking operation movement of the fluid motor causes the two jaws to center on the tire, and it is, therefore, important that the jaw be freely reciprocal on the rod 20 so as to correctly center on the tire for breaking both beads of the tire loose from the wheel. The bead breaker swings through an arc laterally on the rod 20 to a position indicated in solid lines in Fig. 1, away from the tire so that the tire may be placed or removed from the table without interference from the bead breaker. To prevent further arcuate movement of the bead breaker, a stop 24 is provided which prevents movement of the bead breaker beyond the centered position. The rod 20 is mounted on a rotatable bar 25, which is threadedly engaged with a second upright support 26. A hand crank 27 turns the bar 25 advancing or retracting the bead breaker in relation to the position of the tire. The mount 26 is carried on a lateral supporting arm 28 and is secured thereto by a plurality of bolts 29. The lateral support 28 is mounted on the vertical table support 4 by a plurality of bolts 30.

In operation, the bead breaking jaws are swung out of tire engaging position to the position indicated in solid lines in Fig. 1. After a tire is mounted and locked on the table 3 the bead breaker is swung in position for operation, indicated by dashed lines in Fig. 1. The bead breaking points 9 and 8 are moved into position above the intersection of the tire and rim by means of the crank 29, so as to contact or almost contact the rim of the tire. Air is then introduced into the cylinder 10 through the valve 13. When the points 8 and 9 have contacted the tire and slightly depressed its side walls, the hand crank is turned to move the bead contacting points under the rim into direct contact with the tire beads. The point 9 goes under the rim portion 31 to contact the bead 32 of the tire, and the point 8 goes under rim section 33 to contact the bead 34. After the points are moved under the rims, more air is applied to the cylinder so that the jaw 7 moves toward jaw 6. One of the beads 34 or 32 breaks loose first from its adjoining rim, and that jaw moves toward the other jaw to the point where it contacts the rim, for example, if the jaw 7 breaks the upper rim 32 first, the jaw 7 moves downwardly to the point where the rim contacting point 16 contacts the rim 31. Further addition of air to the cylinder now causes the jaw 6 to move upwardly so that the point 8 breaks the lower bead 34 free from the rim 33. Since it is not known which bead will be broken from the rim first, the jaws must be in a position to move freely up and down on the rod 20. When the bead has been broken loose from the rim at one point, the air is released from valve 13 and the wheel turned to another spot where the air is again applied to break the beads loose from the rim. After the beads of a tire have been broken from the wheel at one point it is possible to retain the points 9 and 8 under the rims as the tire is rotated so that the one advancing of the jaws onto the rim will be sufficient. When the bead has been broken from the rim all around the wheel the air is released from the cylinder and the bead breaker is moved to retracted position so that the tire may be removed from the wheel.

The bead breaker operates independently of the wheel table and wheel support so that in certain installations where two tire changing machines are utilized one bead breaker may be independently mounted between the two tire changing machines so that only the one bead breaking machine is required for the two tire changing machines. Also, the ability to advance and retract the machine from its position on the wheel permits the bead breaker to be used with various sizes of tires and wheels without the use of special tools. The bead breaker may also be mounted independently on a movable stand, and by providing a hook for holding it in position against the machine, the bead breaker may be used with almost any type of tire changing machine. Since an air hose is required for changing a tire, the use of the air cylinder for the bead breaker provides a neat and efficient device. Furthermore, the air pressure required for the cylinder is not a very high pressure so that a very inexpensive cylinder may be utilized for supplying the force required to break the bead from the vehicle wheel. By utilizing a large diameter cylinder the force of the fluid pressure in the cylinder is relatively small so that thin wall tubing may be used for this cylinder 12 providing a very inexpensive device. The valve 13 may be an open valve for most purposes, since there is no need to hold the jaws in closed position. Normally, the jaws are moved to closed position and immediately released. The device may, also, be made with an air cylinder on each jaw instead of the top jaw only. In this case the bead breaker will center automatically without the use of the vertical rod, when the two cylinders are supplied from a common air line. By utilizing the rim contacting stops, the jaw which loosens the first is stopped and the other is moved by its cylinder until its rim contact is stopped by the adjacent rim.

While the invention has been illustrated by reference to a single device, there is no intent to limit the scope of the invention to the precise details so set forth, except insofar as limited by the appended claims.

I claim:
1. Equipment for removing tires from a wheel comprising a first support, means to secure a wheel on said first support, a second support disposed in spaced relation to said first support and at a distance substantially greater than the radius of a wheel and tire, means to interconnect said first and second supports to prevent separation thereof, a C-shaped member having an opening of a size to readily receive a tire cross-section therein, means mounted on said second support to support said C-shaped member for free reciprocal movement parallel to said supports, bead engaging means on one end of said C-shaped member, reciprocating power means on the other end of said C-shaped member and having a portion projecting toward said first end of said C-shaped member, a bead engaging element on said portion of said reciprocating power means opposite the bead engaging means of said first end.

2. Equipment for removing tires from a wheel comprising a first upright support, means to secure a wheel in horizontal position on said first upright support, a second upright support disposed in spaced relation to said first upright support at a distance substantially greater than the radius of a wheel and tire, means to interconnect said first and second upright supports to prevent separation thereof, a C-shaped member having an opening of a size to readily receive a tire cross-section therein, means mounted on said second support to support said C-shaped member for pivotal movement about said second upright support and for free reciprocal movement parallel to said upright supports, bead engaging means on one end of said C-shaped member, a fluid operated cylinder on the other end of said C-shaped member and having a piston rod projecting toward said one end of said C-shaped member, a bead engaging element on said piston rod opposite the bead engaging means on said one end of said C-shaped member.

3. The invention according to claim 2 in which said bead engaging means on said one end of said C-shaped member has a rim contacting element which engages the rim after the bead adjacent said one end of the C-shaped member is removed from the adjacent rim portion and the piston rod carries a rim engaging element for contacting the other rim portion whereby when one bead is removed from its seat, the other bead will be removed by the reaction between the adjacent rim portion and the opposite bead engaging element thereby avoiding excessive strain on the tire carcass.

References Cited in the file of this patent
UNITED STATES PATENTS

| | | |
|---|---|---|
| 2,212,768 | Bonneau | Aug. 27, 1940 |
| 2,333,880 | Ohlsen | Nov. 9, 1943 |
| 2,534,950 | Butterfield et al. | Dec. 19, 1950 |
| 2,577,910 | Oliva | Dec. 11, 1951 |
| 2,616,487 | Parks | Nov. 4, 1952 |
| 2,720,915 | Lenoir | Oct. 18, 1955 |
| 2,837,147 | Henderson et al. | June 3, 1958 |